United States Patent [19]

Grosser et al.

[11] Patent Number: 5,300,350
[45] Date of Patent: Apr. 5, 1994

[54] BLACK-COLORED, LASER-WRITABLE BLENDS OF CARBONATE POLYMER AND POLYESTER

[75] Inventors: Brian K. Grosser; Thomas L. Miller, both of Midland, Mich.

[73] Assignee: The Dow Chemical Company, Midland, Mich.

[21] Appl. No.: 21,034

[22] Filed: Feb. 22, 1993

[51] Int. Cl.$^5$ .............................................. B32B 3/00
[52] U.S. Cl. ..................................... 428/195; 428/206; 428/323; 428/338; 428/339; 428/408; 428/480; 428/913; 430/945; 346/76 L; 346/135.1; 252/962; 525/439
[58] Field of Search ............... 428/206, 323, 338, 339, 428/408, 913, 195, 480; 430/945; 346/76 L, 135.1; 252/962; 525/439

[56] References Cited

U.S. PATENT DOCUMENTS

| | | | |
|---|---|---|---|
| 3,615,809 | 10/1971 | Nagle et al. | 106/300 |
| 4,391,764 | 7/1983 | Edinger et al. | 264/25 |
| 4,753,863 | 6/1988 | Spanjer | 430/138 |
| 4,810,733 | 3/1989 | Sakuma et al. | 523/206 |
| 4,859,738 | 8/1989 | Farah et al. | 525/67 |
| 4,959,406 | 9/1990 | Foltin et al. | 524/413 |
| 5,178,930 | 1/1993 | Sakai et al. | 428/195 |
| 5,189,091 | 2/1993 | Laughner | 524/445 |

FOREIGN PATENT DOCUMENTS 63-205290  8/1988  Japan .

Primary Examiner—Patrick J. Ryan
Assistant Examiner—Marie R. Macholl

[57] ABSTRACT

Laser-writable, black-colored blends of carbonate and polyester resins are provided by the incorporation of a black colorant formulation comprising carbon black and a fatty acid metal salt. Zinc stearate is a preferred fatty acid metal salt. The black colored resin blends can be inscribed using standard YAG lasers and maintain an excellent balance of other properties including surface aesthetics, physical properties, heat resistance, chemical resistance and processability.

7 Claims, No Drawings

BLACK-COLORED, LASER-WRITABLE BLENDS OF CARBONATE POLYMER AND POLYESTER

The present invention relates to black colored carbonate polymer blends comprising a polyester and a black colorant formulation which makes the blend suitable for being inscribed with laser-written markings. It has surprisingly been found that using carbon black as the black colorant and incorporating a fatty acid metal salt results in a black colored carbonate polymer blend that is sufficiently laser-writable. As used herein, the term "laser-writable" refers to the ability of shaped articles which are formed from the resins to be inscribed or written upon with standard laser marking devices such as the known YAG laser.

Carbonate polymer blend compositions comprising a polyester resin component, have proven to be very suitable for molding into a wide variety of articles. The combination of properties including toughness, heat resistance and chemical resistance are very desirable in a number of applications. Depending upon the applications in which the molded articles are to be used, it is often times desirable to provide any necessary markings, such as bar codes, trademarks, etc., by means of laser inscription directly into an unpainted surface the resin of a molded article. In this way, there do not need to be any stickers or painted markings which can become scratched or damaged by heat, physical impact, or chemical exposure.

While many types of polymer resins, including black colorant-containing resins, can be directly inscribed or written upon with the standard laser inscription devices, it has been found to be difficult to prepare black colored carbonate polymer blends comprising a polyester resin component, which blends are both laser-writable and maintain good surface aesthetics when molded into articles. The shallow burn made by the laser beam remains black, instead of appearing as a grayish or off-white tone as in other black-colored resins. Therefore, the laser marking does not contrast sufficiently from the rest of the article surface and is not visually observable nor readable with optical bar code scanning devices. In some cases, blend components which appear to result in at least some degree of laser writability are found to result in unacceptable surface aesthetics and/or reduced resin processability.

As disclosed in U.S. Pat. Nos. 3,615,809 and 4,810,733, there are many different types of colorants, including carbon black, known for use in a wide range thermoplastic resins. In these patents it is also taught that wax like additives, including metal salts of fatty acids, can be employed with such pigments and colorants in the indicated polymer resins. There is, however, no discussion as to laser-writability of black colored articles and particularly as to how to make a laser-writable black colored carbonate polymer blend comprising a polyester component.

U.S. Pat. Nos. 4,859,738 and 5,189,091 disclose blends of carbonate polymer and polyester resins containing additional resin components which are found to have some degree of laser-writability with carbon black pigmentation. However, these blends have been found to have less desirable combinations of processability and surface aesthetics in terms of undesired pearlessence and/or streaking.

It would therefore be desirable to obtain a black colored carbonate polymer and polyester blend resin which would be able to be laser-inscribed using standard laser inscription devices. Accordingly, it is an object of the present invention to provide an improved, black colored carbonate polymer blend resin comprising a polyester resin component, which blend is able to be inscribed or written upon with standard laser devices. It is a further object to provide a colorant formulation that provides the ability to be laser inscribed while maintaining the desirable combination of other resin blend properties such as surface aesthetics and processability.

In one embodiment, therefore, the present invention is a black colored resin blend comprising a carbonate polymer blend, which carbonate polymer blend consists essentially of a carbonate polymer and a polyester resin, and a black colorant formulation characterized in that the black colorant formulation comprises amounts of carbon black and a fatty acid metal salt effective to permit laser inscription of articles molded from such resin blend. Preferably such carbonate polymer blend consists essentially of from about 30 to about 80 weight percent carbonate polymer and from about 20 to about 70 weight percent polyester, which weight percents are based upon the total weight of carbonate polymer and polyester. Preferably the carbon black is employed in the compositions according to the invention in amounts of at least about 0.01 percent by weight based on the total composition weight, preferably at least about 0.05 percent by weight and most preferably at least about 0.08 percent by weight and up to about 0.3 percent by weight, preferably up to about 0.15 percent by weight and most preferably up to about 0.12 percent by weight.

Typically the fatty acid metal salt is employed in the compositions according to the invention in the range of from about 0.05 to about 0.5 percent by weight based on the total composition weight, preferably in amounts of from about 0.15 to about 0.25 percent by weight.

In another embodiment, the present invention is a black, unpainted, laser inscribed shaped article prepared from a black colored resin blend comprising a carbonate polymer blend which blend consists essentially of a carbonate polymer and a polyester resin and a black colorant formulation of carbon black and a fatty acid metal salt in amounts effective to permit laser inscription of articles molded from such resin blend.

In a further embodiment, the present invention is a process for preparing black, unpainted laser-inscribed shaped articles from carbonate polymer blends comprising the steps of preparing a carbonate polymer blend consisting essentially of carbonate polymer and polyester and comprising amounts of carbon black and a fatty acid metal salt effective to permit laser inscription of articles molded from such resin blend, preparing a shaped article from such resin blend, and using a means for providing laser markings to provide such markings on the shaped article. Preferably the process employs means for laser marking with a wavelength of about 1062 nanometers.

The carbonate polymer resins usefully employed according to the present invention are known and described in the prior art and are preferably the well known aromatic polycarbonates. More particularly such resins include the polycarbonate resins obtained by the processes known in the art, for example, by the interfacial polycondensation process, polycondensation in a homogeneous phase or by transesterification. The suitable processes and conditions have been disclosed in the literature and are not critical to the claimed invention. In preparing such aromatic polycarbonates dihydroxyaryl compounds are polymerized in an interfacial polymerization with phosgene or a bischloroformate in the presence of methylene chloride and an acid binding agent such as an alkali metal hydroxide or pyridine. Dihydroxy compounds are polymerized in a solution or melt process in the presence of a dicarbonate such as diphenylcarbonate or dimethylcarbonate.

Among the useful aromatic dihydroxy compounds in the practice of the invention are hydroquinone, resorcinol, bis-(hydroxyphenyl)alkanes, bis-(hydroxyphenyl)-cycloalkanes, bis-(hydroxyphenyl)ethers, bis-(hydroxyphenyl)ketones, bis-(hydroxyphenyl)-sulfoxides, bis-(hydroxyphenyl)sulfones and $\alpha,\alpha$-bis-(hydroxyphenyl)-diisopropylbenzenes. Further specific examples of suitable dihydroxy compounds are the bisphenols including 2,2-bis-(4-hydroxyphenyl)propane (bisphenol A), 2,4-bis-(4-hydroxyphenyl)-2-methylbutane, 1,1-bis-(4-hydroxyphenyl)cyclohexane, $\alpha,\alpha$-bis-(4-hydroxyphenyl-p-diisopropylbenzene, 2,2-bis-(3-chloro-4-hydroxyphenyl)propane, 2,2-bis-(3,5-dichloro-4-hydroxyphenyl) propane, 2,2-bis-(3,5-dibromo-4-hydroxyphenyl) propane and 1,1-bis-(4-hydroxyphenyl)-1-phenylethane hydroxybenzophenone and 4,4-sulfonyl diphenol. The polycarbonates of the invention may entail in their structure units derived from one or more of the suitable dihydroxy compounds. Dihydroxy compounds especially well suited for preparation of aromatic polycarbonates include bisphenol A, tetrabromobisphenol A, tetramethylbisphenol A, 1,1-bis(4-hydroxyphenyl)-1-phenylethane polycarbonate, bishydroxyphenyl fluorene and mixtures of two or more of these.

The aromatic polycarbonate resins typically have a molecular weight of from about 12,000 to 100,000 with the molecular weight range of from about 15,000 to about 40,000 more preferred for blends according to the invention and the range of from about 25,000 to about 40,000 more preferred. As used herein, the term molecular weight refers to the weight average molecular weight of the polymer (Mw) as measured by gel permeation chromatography.

The polycarbonate advantageously has a melt flow rate of at least about 0.1 grams per 10 minutes (g/10 min), preferably at least about 1 g/10 min, and more preferably at least about 2 g/10 min but preferably less than about 100 g/10 min, more preferably less than 90 g/10 min and most preferably less than 85 g/10 min as measured by the ASTM Procedure D-1238 at a temperature of 300° C. with a 1.2 kilogram (kg) weight.

In the preparation of the polycarbonate resins of the invention, monofunctional reactants such as monophenols are typically used as chain terminators in order to limit their respective molecular weights. Also, branching may be obtained by the incorporation, in the respective processes, of small amounts, preferably of between about 0.05 and 2.0 molecular percent (relative to the dihydroxy compound employed) of branching agents which are at least trifunctional compounds, especially, compounds having three or more phenolic hydroxyl groups.

As used herein, the term carbonate polymers would also include the known carbonate-ester copolymers that can be prepared with minor amounts (less than 50, preferably less than 40 weight percent) of a dicarboxylic acid or dicarboxylic acid derivative comonomer. Known and preferred dicarboxylic acid or dicarboxylic acid derivative comonomers include oxalic acid, adipic acid, sebacic acid, terephthalic acid, isophthalic acid and the like.

The polyester components suitable for use in the compositions of this invention are similarly generally well known to those skilled in the area of thermoplastic polymers. Methods and materials useful for the production of polyesters are discussed in Whinfield, U.S. Pat. No. 2,465,319, Pengilly, U.S. Pat. No. 3,047,539 and Russell, U.S. Pat. No. 3,756,986, each of which is incorporated herein by reference. As is known, polyesters may be made by the self-esterification of hydroxycarboxylic acids, or direct esterification, which involves the reaction of a diol with a dicarboxylic acid with the resulting elimination of water, giving an -[-AABB-]-polyester. Alternatively, but in like manner, ester-forming derivatives of a dicarboxylic acid can be heated with a diol to obtain polyesters in an ester interchange reaction. Suitable acid derivatives for such purpose are esters, halides, salts or anhydrides of the acid. Polyesters can also be produced by a ring-opening reaction of cyclic esters or lactones, for which organic tertiary bases and alkali and alkaline earth metals, hydrides and alkoxides can be used as initiators.

Whether a polyester is crystalline or amorphous is typically a function of the symmetry of the starting materials from which it is made. When one or more hydrogens on the diol and/or the diacid (or derivative) which are reacted to form a polyester are replaced by larger radicals such as alkyl or halogen, the intermolecular spacing of the resulting molecules may be disrupted if the presence of the substituent creates asymmetric or irregularly shaped molecules. The component containing the substituent may also be combined into the polyester molecule in random orientation, resulting in structural irregularity in the polymer chain. Factors which can influence crystallization of ring-containing polyesters are the directionality of the ester groups, the stereochemistry of the rings and variations in symmetry where the rings are bridged. For example, a poly(alkylene isophthalate) crystallizes only with difficulty, and a polyester prepared from phthalic acid typically does not crystallize at all. However, where the amount of monomer containing the asymmetry is small in relation to the remainder of the starting materials, the portion of the resulting polyester molecule which suffers from structural irregularity will also be small, and crystallization will typically not be impeded. A crystalline material may be identified by the endotherm it displays on a differential scanning calorimeter. A preferred polyester for use in this invention is a crystalline polyester having a melting point of 254°–260° C.

Suitable reactants for making the polyester used in this invention, in addition to hydroxycarboxylic acids, are diols and dicarboxylic acids either or both of which can be aliphatic or aromatic. A polyester which is a poly(alkylene alkanedicarboxylate), a poly(alkylene phenylenedicarboxylate), a poly(phenylene alkanedicarboxylate), or a poly(phenylene phenylenedicarboxylate) is therefore appropriate for use herein. Alkyl portions of the polymer chain can be substituted with, for example, halogens, alkoxy groups or alkyl side chains and can contain divalent heteroatomic groups (such as —O—, —S— or —SO$_2$—) in the paraffinic segment of the chain. The chain can also contain unsaturation and non-aromatic rings. Aromatic rings can contain substituents such as halogens, alkoxy or alkyl groups, and can be joined to the polymer backbone in any ring position and directly to the alcohol or acid functionality or to intervening atoms.

Typical alkylene diols used in ester formation are the $C_2$-$C_{10}$ glycols, such as ethylene-, propylene-, and butylene glycol. Alkanedicarboxylic acids frequently used are oxalic acid, adipic acid and sebacic acid. Diols which contain rings can be, for example, a 1,4-cyclohexylenyl glycol or a 1,4-cyclohexanedimethylene glycol, resorcinol, hydroquinone, 4,4'-thiodiphenol, bis-(4-hydroxyphenyl)sulfone, a dihydroxynaphthalene, a xylylene diol, or can be one of the many bisphenols such as 2,2-bis-(4-hydroxyphenyl)propane. Aromatic diacids include, for example, terephthalic acid, isophthalic acid, naphthalenedicarboxylic acid, diphenyletherdicarboxylic acid, diphenyldicarboxylic acid, diphenylsulfonedicarboxylic acid, diphenoxyethanedicarboxylic acid.

In addition to polyesters formed from one diol and one diacid only, the term "polyester" as used herein includes random, patterned or block copolyesters, for example those formed from two or more different diols and/or two or more different diacids, and/or from other divalent heteroatomic groups. Mixtures of such copolyesters, mixtures of polyesters derived from one diol and diacid only, and mixtures of members from both of such groups, are also all suitable for use in this invention, and are all included in the term "polyester". For example, use of cyclohexanedimethylol together with ethylene glycol in esterification with terephthalic acid forms a clear, amorphous copolyester ("PETG") of particular interest. Also contemplated are PETG; liquid crystalline polyesters derived from mixtures of 4-hydroxybenzoic acid and 2-hydroxy-6-naphthoic acid; or mixtures of terephthalic acid, 4-hydroxybenzoic acid and ethylene glycol; or mixtures of terephthalic acid, 4-hydroxybenzoic acid and 4,4'-dihydroxybiphenyl.

Aromatic polyesters, those prepared from an aromatic diacid, such as the poly(alkylene phenylenedicarboxylate)s, polyethylene terephthalate and polybutylene terephthalate, or mixtures thereof, are particularly useful in this invention.

The carbonate polymer/polyester resin blends suitable for use according to the present invention desirably consist essentially of carbonate polymer in amounts of from about 30 to about 80 percent by weight based on carbonate polymer and polyester components, preferably from about 35 to about 75 percent by weight and more preferably from about 40 to about 70 percent by weight. The polyester component is then correspondingly employed in amounts from about 20 to about 70 percent by weight based upon weight of the carbonate polymer and polyester components, preferably from about 25 to about 65 weight percent and more preferably from about 60 to about 30 weight percent.

To the extent that the laser writability and surface aesthetics are maintained, the carbonate polymer/polyester blends according to the present invention can also contain additional polymer components such as elastomeric polymeric components for impact modification and/or compatibilization. In this regard, it has been found that the use of ethylene/carbon monoxide copolymers while resulting in a degree of laser writability and having other benefits in terms of resin blend properties, results in black colored resins having less desirable surface aesthetics than the resins according to the invention.

As mentioned above, carbon black is a known polymer formulation additive utilized in a broad range of polymer resins as a black colorant and/or to make the resins electroconductive. Thus, the carbon black materials suitable for use in the present invention are well known. As known, the carbon black preferably has an average particle size in the range of from about 0.005 to about 0.1 micrometer (micron), desirably is characterized by a jetness index of about 100 or lower (as measured by a Cabot Nigrometer which measures relative diffuse reflectance of a dispersion of the carbon black, lower values indicating greater "jetness" or a higher degree of blackness), a surface area of from about 25 to about 560 square meters per gram ($m^2/g$), and a tinting strength index of from about 40 to about 150, preferably 40 to 130 as measured by bleach testing, these test methods being commonly known and used in this area. Carbon black materials suitable for use according to the present invention which are commercially available include Cabot Monarch 800, 880 and 1000 brand carbon black products.

The carbon black is employed in the compositions according to the invention in amounts sufficient to result in the desired black coloration in the articles prepared from the resins. Sufficient black coloration in the polymer blends compositions according to the invention is determined by measurement of the darkness or L-value of a surface of an article molded from the resin. As is known, the L-value can conveniently be measured by a color spectrophotometer using the CIELAB color scale, the lower the L-value, the darker or blacker the surface.

Typically carbon black is employed in the compositions according to the invention to achieve sufficient levels of blackness in amounts of at least about 0.01 percent by weight based on the total composition weight, preferably at least about 0.05 percent by weight and most preferably at least about 0.08 percent by weight. While higher levels of carbon black can be employed, typically carbon black is employed in the compositions according to the invention in amounts of up to about 1 percent by weight based on the total composition weight, preferably up to about 0.3 percent by weight, more preferably 0.15 percent by weight and most preferably up to about 0.12 percent by weight.

Unlike most other resin types, the carbonate polymer blends containing a polyester component were found to be difficult or impossible to laser inscribe and maintain desirable surface properties when they contained carbon black colorants. This was not expected to be a problem since many carbon black colored resins are able to be directly laser inscribed, the laser-inscribed marking showing up as a grayish or off-white color. In attempting to obtain laser-writable, black colored blends of carbonate and polyester resins, a series of further additives and colorants were evaluated to determine if they would produce laser writability and have acceptable surface aesthetics. Surprisingly, the combination of carbon black colorant with a fatty acid metal salt was the only additive found to produce laser writability with excellent surface aesthetics.

The fatty acid metal salts suitable for use in the compositions according to the present invention can employ one or more of the known fatty acid compounds ranging from eight to thirty carbons in the chain, preferably from 12 to 22, more preferably from 14 to 18. Preferred fatty acids include stearic acid, palmitic acid and mrystic acid. Stearic acid has been found to be a preferred fatty acid component for use in the fatty acid metal salts suitable for use in the present invention.

As the metal cation for the fatty acid metal salt, one or more of the cations of the group IA, IIA, or IIB elements can be employed. Suitable metal cations include zinc, calcium, magnesium, sodium and the like. Preferably the metal is selected from group IIB and most preferably it is zinc. A most preferred fatty acid metal salt is zinc stearate.

The fatty acid metal salt is employed in the compositions according to the invention in amounts sufficient to result in the desired degree of contrast in the laser written markings on articles prepared from the resins. Sufficient contrast can be determined by, among other things, marks that are easily observed by the unaided eye and preferably marks that are readable by the standard optical laser scanners such as are used at check-out stations in many retail stores.

Typically the fatty acid metal salt is employed in the compositions according to the invention in the range of from about 0.05 to about 0.5 percent by weight based on the weight of the total composition weight, preferably in amounts of from about 0.15 to about 0.25 percent by weight.

In another aspect, the present invention is an improved process for producing unpainted, black articles with laser markings characterized by the use of the above-described carbonate polymer/polyester resin blend with the carbon black and fatty acid metal salt additives and employing a standard means for laser writing on articles.

Suitable means for laser writing on articles, including the appropriate lasers and laser writing devices are known in the art and include the known and preferred YAG lasers that are typically used for this application, having a wavelength of about 1062 nanometers (nm). Other lasers that are believed to be suitable for use according to the process of this invention include Argon and carbon dioxide lasers.

In addition to the above-described carbon black and fatty acid metal salt, other additives not adversely affecting the laser writability and surface aesthetics can be included in the colorant formulation component of the claimed polymer blend such as ignition resistance additives, antistatic agents, fillers (i.e., glass fibers, talcs, clays), antioxidants, heat stabilizers, ultraviolet light absorbers, mold release agents and other additives commonly employed in blend resins of this type.

As mentioned above, the resin blends according to the present invention possess very desirable combinations of properties that make them suitable for use in a number of different applications such as injection molding processes for the production of business machine parts and housings and alike, extrusion and thermoforming.

The following experiments are given to further illustrate the invention and should not be construed as limiting the scope of the below claims. In the following experiments the parts and percentages are by weight unless otherwise indicated. The following formulations were prepared in attempting to develop a black colored polyester/polycarbonate blend that was laser-writable. In the following formulations the carbonate polymer/polyester blend "(PC/PET)" is SABRE TM 1647 brand blend resin containing about 54 percent by weight aromatic polycarbonate based on bisphenol A and phosgene, about 35 percent by weight polyethylene terephthalate polyester resin, and about 10 percent by weight butadiene rubber-based impact modifying polymer as well as standard stabilizers and antioxidants. SABRE TM is a registered trademark of and commercially available from The Dow Chemical Company.

Formulation A—Carbon Black (no fatty acid metal salt)

A black colored polycarbonate/polyester blend "(PC/PET)" was prepared using carbon black, at a level of 0.1 percent. The carbon black was Monarch 800 carbon powder available from Cabot and referred to as Pigment Black 7, CI# 77266, CAS# 1333-86-4. The samples were compounded on a Killion KL-125 brand single screw extruder at a melt temperature of 525° F. (274° C.) and pelletized. The resin samples were placed in a drying oven for 24 hours before molding sample test plaques on an Arburg brand 75 ton injection molding machine equipped with a vented barrel using a 2"×3.5" (about 51 millimeters by 89 millimeters) cavity mold to obtain plaques for laser printability testing. A 525° F. (274° C.) melt temperature and 125° F. (52° C.) mold temperature were used for molding the test specimens.

Formulation B—Iron Oxide Black

According to process used in preparing the resin blend and molded sample test plaques for Formulation A, a black colored PC/PET resin was prepared using 2 percent iron oxide black as the black colorant and used to prepare molded sample test plaques. The iron oxide was MAPICO Black B which is a synthetic iron oxide available from Colombian Chemical also known as Pigment Black II; CI# 77499, CAS# 1317-61-9. This was incorporated at a level of 2 percent by weight based on the colored PC/PET blend.

Formulation C—Iron Oxide/Anthraquinone Dye

According to the process as described above with regard to Formulation A, iron oxide at a level of 1.9 percent and an organic anthraquinone blue dye were used to prepare a black colored PC/PET and molded sample test plaques were prepared. The anthraquinone dye was Blue RR dye available from Mobay and referred to as Solvent Blue 97 CAS# 32724-62-2. The iron oxide was incorporated at a level 1.9 percent and the organic blue dye was incorporated at a level of 0.1 percent to obtain a total colorant concentration of 2 percent based upon the black colored PC/PET formulation.

Formulation D—Multiple Organic Dyes

According to the process as described above with regard to Formulation A, a mixture of organic dyes was prepared and incorporated in PC/PET to prepare a black colored resin and the resin molded into test plaques. The following organic dyes were incorporated in the indicated amounts to obtain a total colorant level 0.5 percent by weight based upon colored PC/PET resin.

| | | |
|---|---|---|
| 0.125% | Mobay Blue RR Solvent Blue 97 | Anthraquinone Dye CAS#: 32724-62-2 |
| 0.125% | Ciba-Geigy Yellow GHS Solvent Yellow 163 | Anthraquinone Dye CAS#: 13676-91-0 |
| 0.125% | Mobay Green 5B Solvent Green 3 | Anthraquinone Dye CI#: 61565 CAS#: 128-80-3 |
| 0.125% | Mobay Red 5B Solvent Red 52 | Anthraquinone Dye CI#: 68210 CAS#: 81-39-0 |

Formulation E—Carbon Black and Fatty Acid Metal Salt

According to process described for Formulation A, carbon black, at a level of 0.1 percent, and zinc stearate, at a level of 0.203 percent, were incorporated in a PC/PET resin and the resin molded into test plaques. The carbon black was Monarch 800 carbon powder available from Cabot and referred to as Pigment Black 7, CI# 77266, CAS# 1333-86-4. Synpro brand zinc stearate ($C_{36}H_{70}O_4Zn$), CAS# 557-05-01 was used.

The indicated test plaques were evaluated for "blackness" using an Applied Color Systems spectrophotometer using large area view/specular included, 10 degree observer for D65 ("Daylight 65") illumination source and the L-values are shown in the following table. The L-value shown in the table is an indication of the lightness/darkness of surface and the lower the number, the darker or blacker the surface.

The laser writing testing was done on the test plaques prepared according to the above description using an Nd:YAG laser model LB1-6000. This is a solid state laser having a wavelength of 1062 nanometers (nm). According to the standard testing method for evaluating laser writability, the laser written plaques were then evaluated visually for the amount of contrast achieved in the laser written marking. As used below, the term "Low" means that there was little or no observable contrast between laser written and unwritten areas. The term "High" as used below means that there was a high degree of contrast between laser written and unwritten areas. More quantitative evaluations of the laser marking can be obtained applying standard color measuring test methods to the laser written areas.

The surface aesthetics were determined by visual observation with "Good" surface aesthetics indicating that there is no visually observable "streaking" or "pearlessence". Otherwise, the presence of visually observable "streaking", or "pearlessence" or other defects would be indicated.

As shown in the following table, Formulation E based upon carbon black and the fatty acid metal salt provided a sufficiently high contrasting mark on the black-colored articles having good surface aesthetics while the other black colorant formulations proved not to be sufficiently laser-writable.

TABLE I

| Formulation | Colorant Formulation | Colorant Amount[1] | L-Value[2] | Laser Marking Contrast[3] | Surface Aesthetics[3] |
|---|---|---|---|---|---|
| A* | Carbon Black | 0.1 | 31.43 | Low | Good |
| B* | Iron Oxide | 2.0 | 29.37 | Low | Good |
| C* | Iron Oxide | 1.9 | 29.05 | Low | Good |
|    | Anthraquinone Blue Dye | 0.1 | | | |
| D* | Anthraquinone Dye Mixture | 0.5 | 28.63 | Low | Good |
| E  | Carbon Black | 0.1 | 30.06 | High | Good |
|    | ZN Stearate | 0.23 | | | |

*Comparative Formulation, not an example of the present invention.
[1] Weight percent based on total composition weight.
[2] Value for illumination source D65 ("Daylight 65") as measured by Applied Color Systems spectrophotometer using large area view/-specular included, 10 degree observer and CIELAB color scale.
[3] Determined by visual observation.

The above results indicate that the combination of carbon black and fatty acid metal salt surprisingly provides a black colored PC/PET resin that is laser-writable and has acceptable surface aesthetics. It is also important to note that in addition to becoming laser-writable and having good surface properties, the black colored PC/PET resin maintained its very desirable balance of properties such as tensile strength, elongation, flexural modulus, tensile strength, impact resistance, heat resistance, processability and chemical resistance.

What is claimed is:

1. A black colored resin blend comprising (a) a carbonate polymer blend which consists essentially of a carbonate polymer and a polyester resin, and (b) a black colorant formulation characterized in that the black colorant formulation comprises from about 0.05 to about 0.03 percent by weight based upon the total black colored resin blend composition weight of carbon black and from about 0.05 to about 0.5 percent by weight based upon the total black colored resin blend composition weight of a fatty acid metal salt effective to permit laser inscription of articles molded from such resin blend wherein the fatty acid is a $C_8$ to $C_{30}$ fatty acid, and the metal of the fatty acid metal salt is a group IA, IIA, or IIB metal.

2. A black colored resin blend according to claim 1 wherein the carbonate polymer blend consists essentially of from about 30 to about 80 weight percent carbonate polymer and from about 20 to about 70 weight percent polyester, said weight percents are based upon the total weight of carbonate polymer and polyester.

3. A black colored resin blend according to claim 1 wherein the fatty acid of the fatty acid metal salt is stearic acid.

4. A black colored resin blend according to claim 1 wherein the metal of the fatty acid metal salt is zinc.

5. A black, unpainted, laser inscribed shaped article prepared from a black colored resin blend according to claim 1.

6. A process for preparing black, unpainted laser-inscribed shaped articles from carbonate polymer blends comprising the steps of:
    (i) preparing a black colored resin blend comprising (a) a carbonate polymer blend consisting essentially of carbonate polymer and polyester and (b) a black colorant formulation comprising from about 0.05 to about 0.3 percent by weight based upon the total black colored resin blend composition weight of carbon black and from about 0.05 to about 0.5 percent by weight based upon the total black colored resin blend composition weight of a fatty acid metal salt effective to permit laser inscription of articles molded from such resin blend wherein the fatty acid is a $C_8$ to $C_{30}$ fatty acid and the metal of the fatty acid metal salt is a group IA, IIA, or IIB metal,
    (ii) preparing a shaped article from such black colored resin blend, and
    (iii) using a laser to provide markings on the shaped article.

7. The process according to claim 6 wherein the laser has a wavelength of about 1062 nanometers.

* * * * *

UNITED STATES PATENT AND TRADEMARK OFFICE
CERTIFICATE OF CORRECTION

PATENT NO. : 5,300,350

DATED : April 5, 1994

INVENTOR(S) : Brian K. Grosser and Thomas L. Miller

It is certified that error appears in the above-identified patent and that said Letters Patent is hereby corrected as shown below:

Column 10, line 26 "about 0.03 percent" should correctly read --about 0.3 percent--.

Signed and Sealed this

Eighteenth Day of October, 1994

Attest:

BRUCE LEHMAN

Attesting Officer   Commissioner of Patents and Trademarks